Aug. 22, 1933.   B. E. LUBOSHEZ   1,923,987
CINEMATOGRAPHIC APPARATUS
Filed May 26, 1931   7 Sheets-Sheet 1

INVENTOR
B. E. LUBOSHEZ

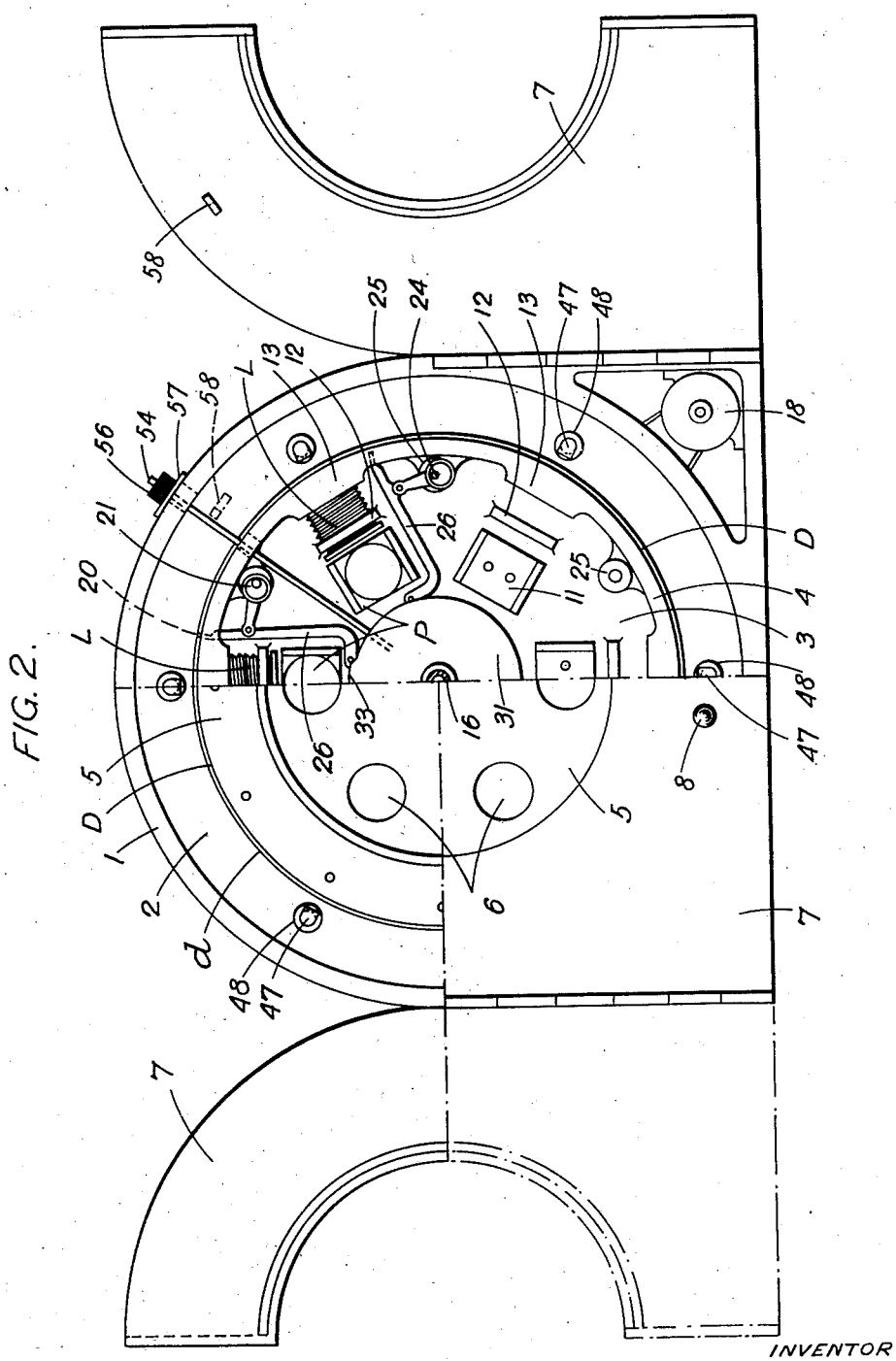

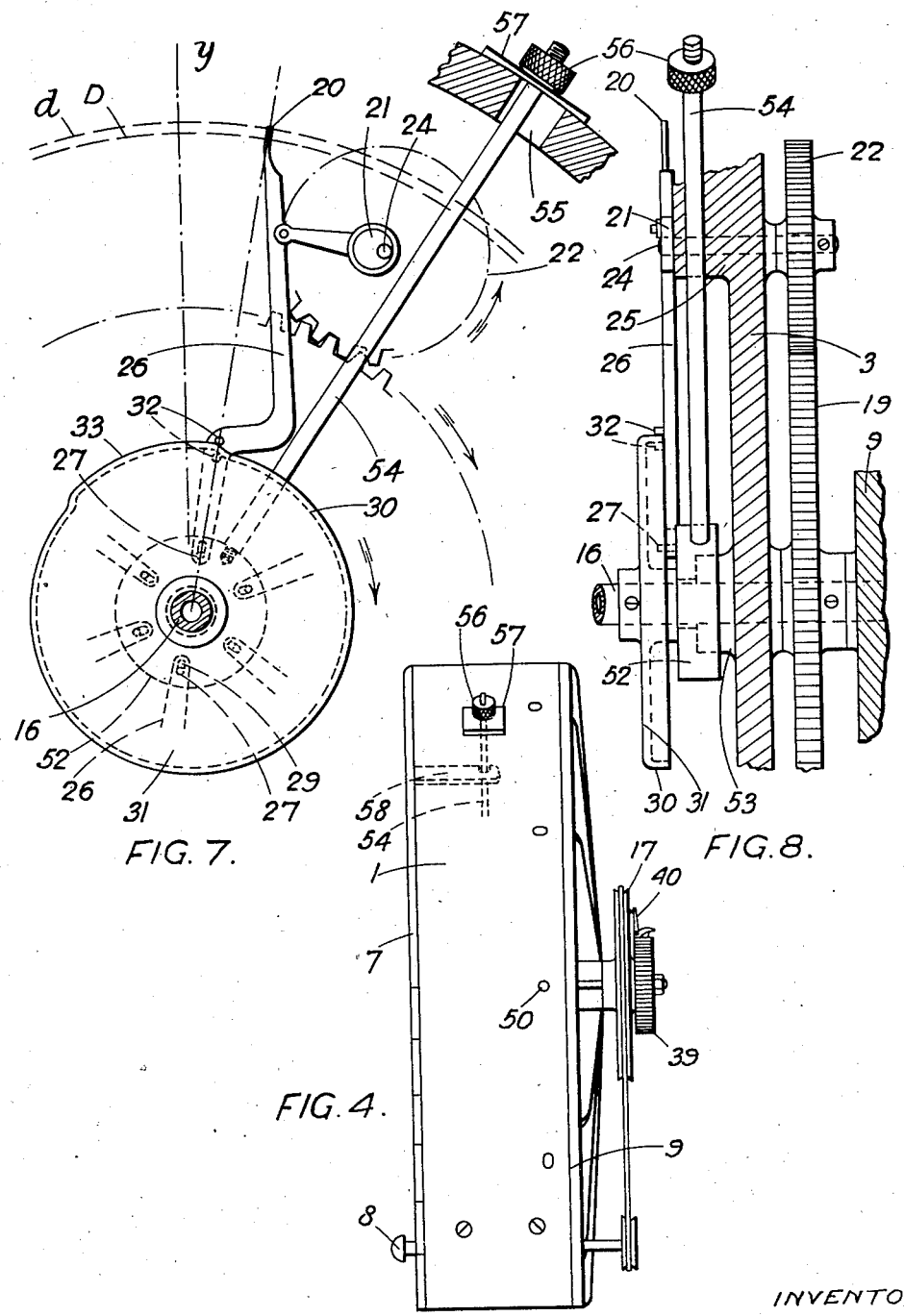

Aug. 22, 1933.    B. E. LUBOSHEZ    1,923,987
CINEMATOGRAPHIC APPARATUS
Filed May 26, 1931    7 Sheets-Sheet 4

INVENTOR
B. E. LUBOSHEZ

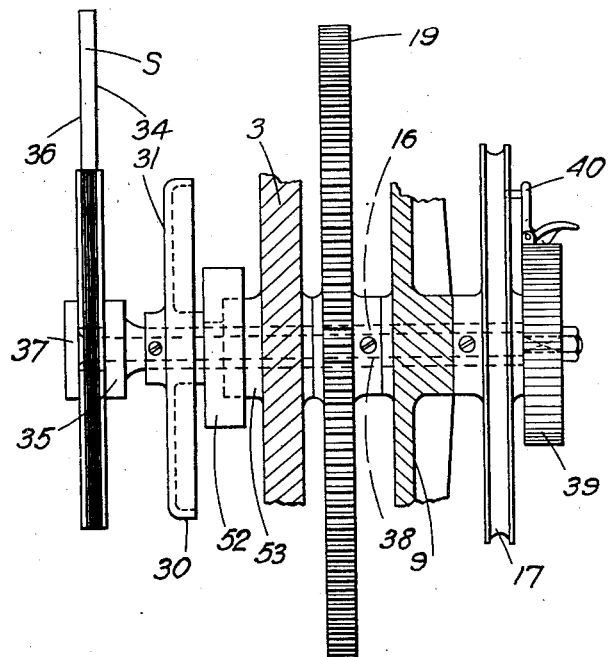

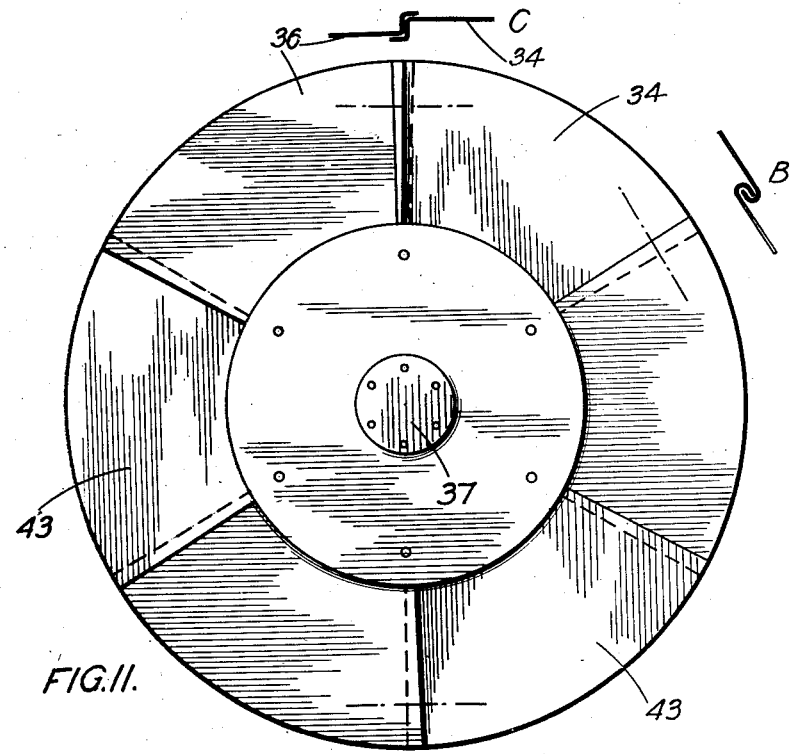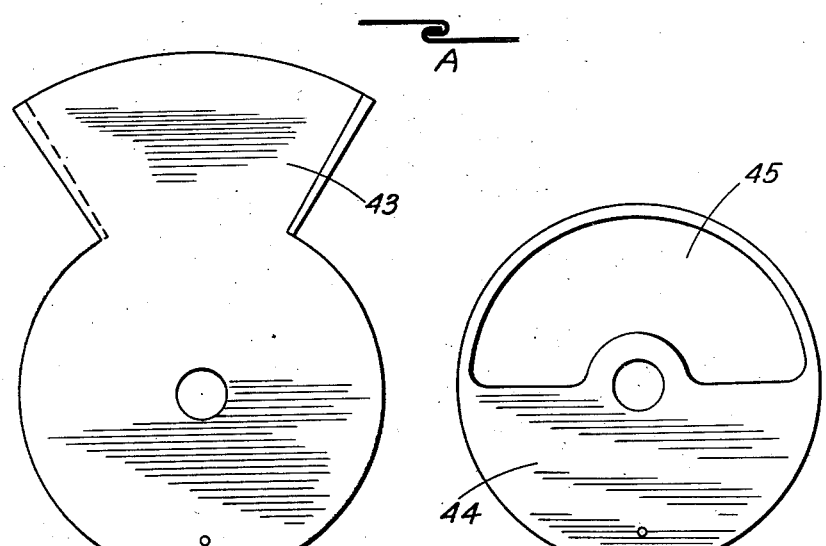

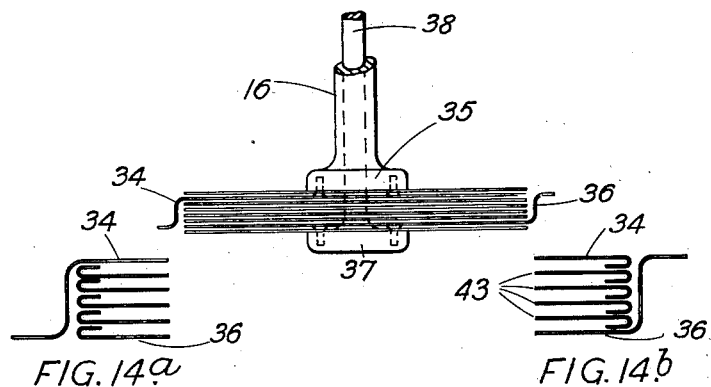
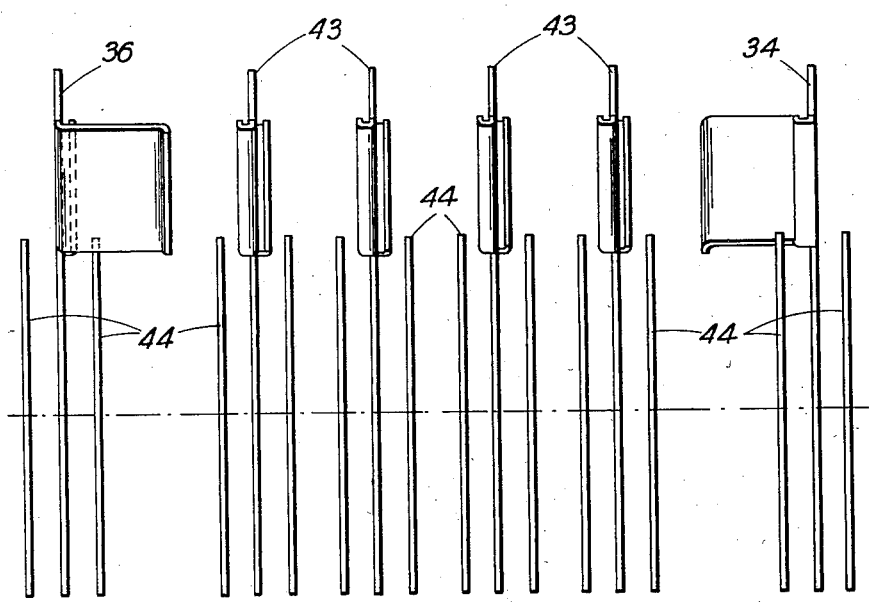

Patented Aug. 22, 1933

1,923,987

UNITED STATES PATENT OFFICE 1,923,987

CINEMATOGRAPHIC APPARATUS

Benjamin Ellan Luboshez, Harrow, England

Application May 26, 1931, Serial No. 540,119, and in Great Britain June 14, 1930

4 Claims. (Cl. 88—166)

The present invention relates to a method of exposing cinematograph films and to apparatus for carrying out this method with the object of giving greater exposure to each image whilst maintaining the same total number of exposures per second, the minimum of 16 projected images per second being necessary to give the impression of continuous motion. Owing, however, to the achievement of improved results hereinafter referred to, this minimum can be further reduced in certain circumstances. Other objects are to secure the various incidental advantages hereinafter referred to.

The invention consists in making exposures alternately through a plurality of objectives, recording the images on separate films or on different parts of the same film. The plurality of series of images so obtained are projected alternately in a similar manner. In this way the number of images per second in a series can be reduced and the exposure correspondingly increased, an exposure being made with one objective whilst another objective is closed during the movement of its corresponding film. In this manner an exposure is always being made, and likewise an image is always being projected, with an almost complete absence of flicker as a consequence.

The invention in its simplest form comprises two cinematograph cameras operated in synchronism, the exposures made with each alternately, and the objectives placed close together side by side. When the revolving obturator shutters have 180° openings, it will be seen that 8 exposures per sec. of $\frac{1}{16}$ sec. duration can be given with each camera, thus giving a total of 16 exposures per sec. each of $\frac{1}{16}$ sec. duration, or the full time utilized for exposure purposes and none lost during changing of the film. Where the movement of the object is sufficiently slow, longer exposures can be given by using more than 2 objectives. Thus with 4 objectives, exposures of $\frac{1}{8}$ sec. are possible whilst still maintaining the minimum of 16 projected pictures per sec. In this case the exposure times and the projected images overlap.

With the foregoing preliminary explanation, the following description of apparatus for carrying out the invention and the more detailed description of the method will be confined to the case where 6 lenses are employed to give 12 exposures per second.

Where a plurality of lenses is employed they are very conveniently arranged in a circle and facing radially inwards, reflecting prisms being located in front of each lens to produce a ring of view-points as close to a common axis as possible. Alternatively, a lens of the type described in my co-pending patent application Serial No. 474,514 filed August 11, 1930 with prismatic rear part can be employed. In this manner a continuous band of film can be employed around the circle of sub-cameras to receive the series of images on separate parts of it. It should be noted that for exposures on continuously moving objects, such as X-ray screens for medical purposes, only a short length of film lasting, say, 5 seconds, is necessary, but up to a point the length of film section available for each series between lenses can be increased by looping.

Fig. 1 of the accompanying drawings illustrates this method, being a diagrammatic front elevation of a camera with 6 lenses $L_1$—$L_6$ having in front of them prisms $P_1$—$P_6$ arranged in a ring around the common axis O. Behind each lens is a corresponding film gate $G_1$—$G_6$ located on a circular film track D, on which is arranged a continuous band of film X looped at $X_1$—$X_6$ between gates. Located in front of the lens-prism apertures is a sector shutter S adapted to revolve at 2 revolutions per sec. about the common centre O. This shutter subtends a minimum angle A sufficient to cover 2 lenses at a time; in the present example this will be 60°+B, or approximately 70°.

The operation of this device is as follows, on the assumption that the shutter and film move in the direction of the arrows shown (though there is no reason why they should not move in opposite directions to one another). Lens $L_1$ has just been closed, and whilst the shutter moves through 60° the film will be moved through gate $G_1$ and the large loop $X_6$ transferred to $X_1$. Meanwhile exposure commences at $G_6$ and continues at $G_{2-5}$ where the film is stationary. When the shutter has moved 60° $L_2$ is closed and $L_1$ is ready to expose, and during the next 60° movement of the shutter the film is moved through gate $G_2$ and the large loop transferred to $X_2$. This cycle is followed around the whole circle until that part of the film first at $G_6$ arrives at $G_1$, when the exposing is stopped and the film changed.

With this device 12 exposures per second can be taken and the same number on projection provided for, each exposure being of nearly $\frac{1}{12}$ second duration. The shutter, of course, can subtend any greater angle and the exposures correspondingly reduced when required, but it will be seen that with a shutter of not more than 180° the object of the invention is achieved.

A camera and projector embodying this principle is illustrated in the remaining figures of the accompanying drawings in which:—

Fig. 2 is a front elevation; bottom left quarter as closed for use, top left quarter with door open for film changing, right half with lens cover off exposing mechanism, certain repeated parts being omitted.

Fig. 4 is a side elevation in direction of arrow IV, Fig. 3.

Fig. 7 is a front elevation of one of the film claw operating gears and Fig. 8 is a side elevation thereof. These and the remaining Figs. are to twice the scale of Figs. 2–4.

Fig. 9 is a side elevation of the shutter with exposure changing gear and Fig. 10 is a rear elevation thereof.

Fig. 11 is a front elevation of a variable shutter completely closed, Fig. 12 is an elevation of an intermediate blade, Fig. 13 an elevation of a blade balancing and spacing device, Fig. 14 a plan of the shutter completely open, Figs. 14a and 14b are greatly enlarged details of Fig. 14, and Fig. 15 is an exploded side elevation of Fig. 14.

Figure 1:
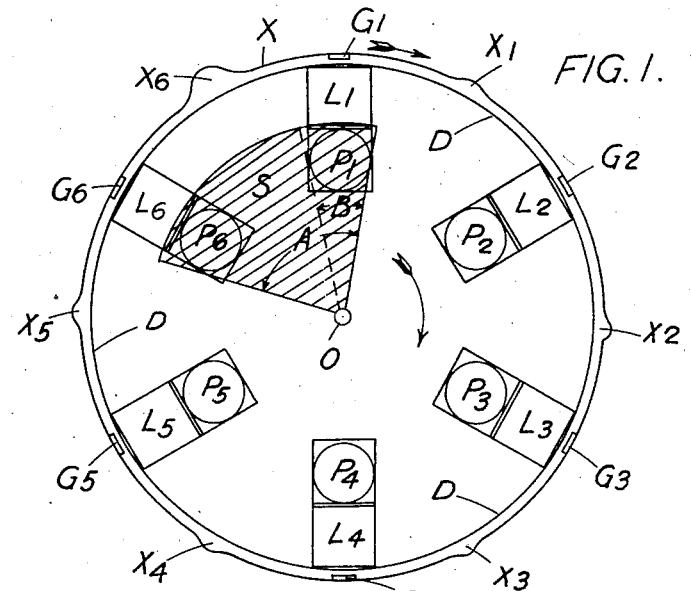

The 6-lens camera illustrated by way of example comprises a casing 1 having an internally extending flange 2 on which is mounted a circular casting or like member 3 carrying substantially the whole of the gear. The casting 3 is provided at its outer edge with a forwardly extending cylindrical portion forming a shell 4 which is adapted to carry the front closing plate 5, and on which is formed the film track D. The plate 5 is provided with six exposing apertures 6 and between these and the prisms the aforementioned sector shutter is located. The annular space between the shell 3 and casing 1, in which the film is located, is closed by a pair of front doors 7 with knobs (8). The rear of the casing is closed by a cover 9 having inspecting doors 10.

The prisms P are mounted on triangular supporting blocks 11 secured to the casting 3, and the lens mounts L are screwed into lugs 12 formed on the casting, and into bosses 13 formed on the inner surface of the shell 4. Since the only practical way of boring and threading 12 and 13 is from the outside of the circle, closing plugs 14 are necessary, each having a film exposing aperture 15, and it should be observed that these plugs should be screwed in and permanently locked in place before the film track D is machined on the casting.

Figure 6:
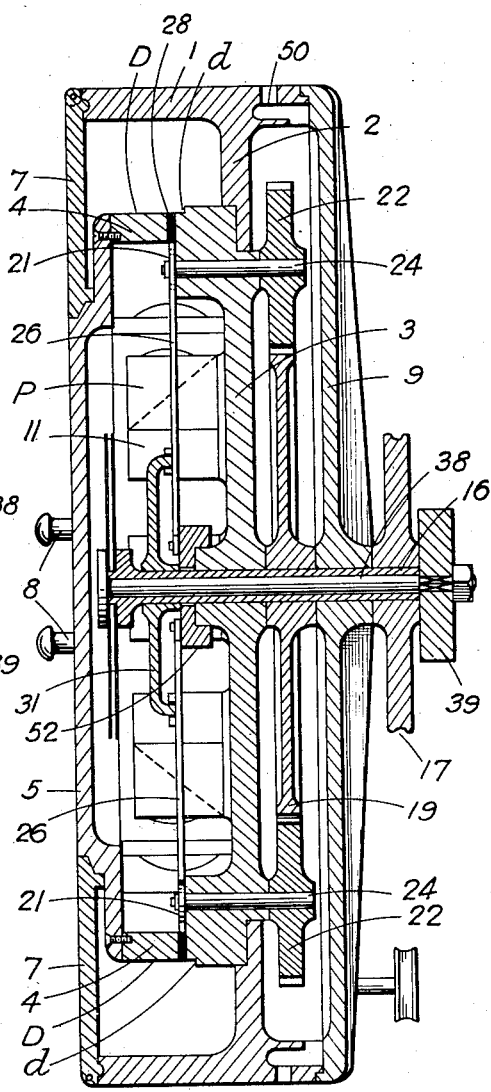
Fig. 6 is a sectional plan on line VI—VI Fig. 3 to the same scale as Fig. 5.

Mounted in bearings in the casting 3 and back cover 9 and coincident with the common axis of the apparatus is a shaft 16 driven by a pulley 17 from a motor 18 conveniently housed in the supporting base part of the casing 1. The shaft 16 carries the revolving shutter S, and a gear wheel 19 for operating the film claws. Attention is now directed to the detail views Figs. 7 and 8. Each film claw 20 is reciprocated by an eccentric 21 which is revolved by a gear 22 driven with a 1:3 ratio by the gear 19. In this manner the operative stroke of the eccentric 21 occurs during one sixth of a revolution of the shaft 16, or whilst the shutter moves through 60°, which as above described is what is required. Eccentrics 21 and gears 22 are both carried by shafts 24 mounted in bosses 25 on the casting 3. To ensure that the film claw 20 makes as little movement as possible relative to the film perforation, it is mounted on a lever 26 which is pivoted at 27 as near as possible to the common axis which forms the centre of curvature of the film track D. All the claws are continuously reciprocated in the slots 28 (Fig. 6), but are normally clear of the film perforations as shown in the latter Fig. The film behind the closed lens is moved at the required instant in the following manner. The connection of the levers 26 to the pivots 27 is by means of slots 29 in the levers, and the latter are normally retained radially inwards by means of the axially turned rim 30 of a disc 31 revolving with the shaft 16, the rim 30 engaging between pins 32 carried by the lever 26. The eccentric 21 is arranged to be just on the end of its stroke as shown in Fig. 6 at the instant the corresponding lens is completely closed by the shutter. In this position there will be practically no reciprocation of the claw 20 so that the latter can be safely thrust radially outwards into the perforation by means of a bulged cam-part 33 of the rim 30, which cam operates on the lever 26 by its engagement with the pins 32. The bulge 33 extends for nearly one sixth of the circumference of the rim, and is adapted to retract the claw 20 while the eccentric is passing its other dead centre, i. e. at the instant the shutter has moved a further 60° and is ready to open the lens. (It should be observed that since the disc 31 is rotating in the same direction as the operative stroke of lever 26, but with the rim 30 at a greater lineal speed than that part of the lever carrying the pins 32, the pins 32 will be farther around the rim 30 when the latter has made one sixth of a revolution, hence the bulge 33 must extend for less than one sixth in order to retract lever 26 at the correct instant). The levers 26 are cranked as shown to be clear of the field of view. It should be clear from the above description how each part of the film is moved in succession whilst the shutter closes the corresponding lens. The film gates and the devices for keeping the film in place and up against side guide d of the track are not shown in any of the Figs., as they are of well-known construction.

Figure 5:
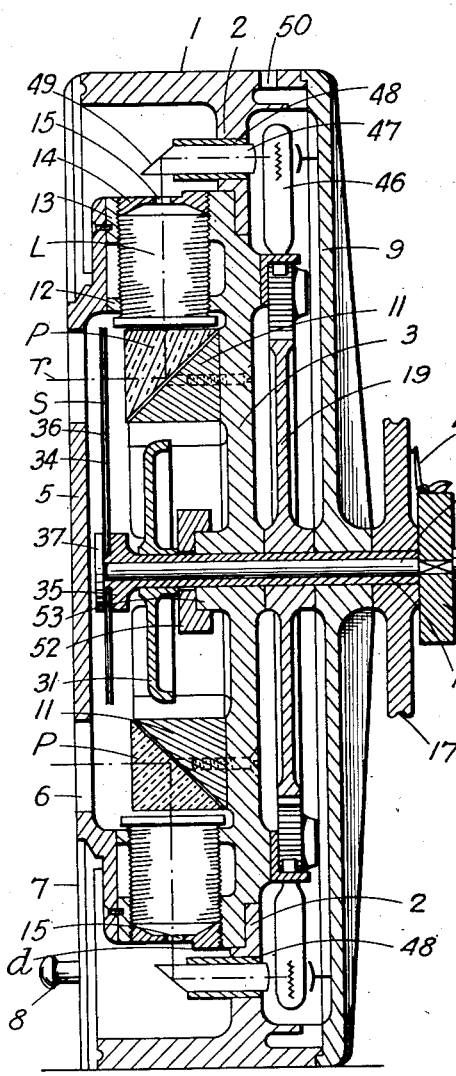
Fig. 5 is a vertical cross section on line V—V Fig. 3 to a 50% larger scale.

To enable the opening of the shutter S to be varied, the shutter is formed of two driven sectors each subtending the minimum angle as above, and between them a plurality of loose sectors, the whole opening and closing venetian fanwise. One driven sector (34) is carried by the flange 35 on the shaft 16, and the other driven sector (36) is carried by the flange 37 on a rod 38, to accommodate which the shaft 16 is formed as a quill shaft (see Figs. 5, 6, and 9). The rear end of the rod 38 carries a knurled head 39, and in use the shutter sectors 34, 36, are locked together in any angular relation by means of a catch 40 on the head 39 which is engaged with one of a plurality of holes 41 in the face of the pulley 17. The latter may bear a scale 42 to show the shutter opening in degrees, or the exposure time when the speed of shaft 16 is constant. Four intermediate sectors 43 (Figs. 11 & 12) are employed, mounted loose on the shaft 16, and their ends are adapted to hook together and to the driven sectors as shown in the edge view details A & B respectively in Fig. 11. The meeting edges of the driven sectors when in the fully closed position overlap as shown in edge view detail C. The hooked edges ensure the pulling out of the sectors as the shutter opening is reduced, but the extent of overlap and the engagement or not of any particular edges at intermediate openings is immaterial. The plan Fig. 14 with the enlarged details of the hooked edges illustrates how all the sectors are packed together when the shutter is fully opened, the overlap edge of each driven sector 34, 36, closing on the opposite edge of the other and on the intermediate sectors, and preventing the movement of the sectors beyond the fully open position into a closing position in the other direction.

In order to balance the shutter at all openings, and incidentally to space the sectors and ensure comfortable engagement of the hooked edges, each sector is balanced separately by means of two discs 44 (Figs. 13 & 15) secured one on each side of it. The balancing is effected by forming an opening 45 in each disc. Fig. 15 shows the relative disposition of discs and sectors.

Figure 3:
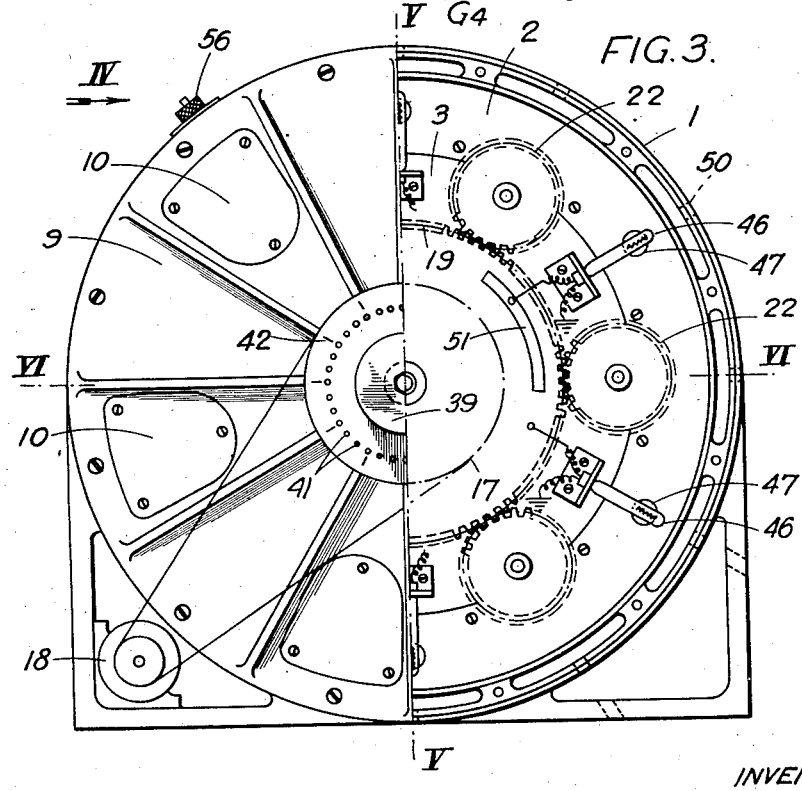
Fig. 3 is a rear elevation; left half external, right half with cover removed.

In order that all images shall be in register on projection it is highly desirable, in order to avoid the difficulty of repeating exact optical conditions on different apparatus, that the taking camera shall be used also as the projector. When this is the case and each film section is projected through the lens that exposed it, it is not essential that all the lenses shall be of the same focal length provided that the image is projected the same size as the original. In the case of X-ray screens, the latter present no disadvantage. The above described apparatus is therefore arranged as a projector by the provision of sources of illumination 46 and condensers 47 mounted in tubes 48, the condensers having reflecting surfaces 49 to direct the light radially inwards through the film. Light-trapped ventilation openings 50 are provided in the casing 1. The lamps can be arranged to light only during the interval required for the alternate projection by means of a contact 51 carried by some rotating part on the shaft 16; in Fig. 3 this is shown on the gear 19, from which it will be insulated.

With this apparatus a shutter opening of 50° will project one picture at a time, each one being replaced immediately by the next without any dark interval. With a shutter opening of 60°, one lens opens as the last closes, thus merging the images and causing a complete absence of flicker as the screen always receives the same amount of light continuously. By opening the shutter still further so that pictures are projected from more than one lens simultaneously, not only is the amount of light on the screen increased, but there is almost a complete absence of graininess. The slight lack of register in the images due to their having been exposed on the object in slightly different positions has not been found in practice to be noticeable with the slow movements met with in medical work. It is doubtful whether there is any advantage to be gained by projecting more than 3 images at once in this manner, i. e. a shutter opening of 180°.

It should be observed that the processing of films causes a shrinkage of about 2% both laterally and longitudinally which will need correction on projection. As the film is held up against the guide d, lateral shrinkage will throw the image 1% off centre, the projected ray r (Fig. 5) being also deflected in the plane of the common axis, each projected image being radially displaced. The effect will be to cause the projected image to move round in a circle, and this is corrected for by moving the screen axially to the position where the deflected rays cross the common axis.

Longitudinal shrinkage would need no correction if the claw 20 acted on the centre line of the image, but since convenient construction renders it necessary for the claw to act some distance from the centre line, the ray r will be deflected at right angles to the deflection due to lateral shrinkage, hence it will not cross the common axis. The effect will be the same, but no movement of the screen will correct it. Correction is done by altering the average position of the stroke of claw 20, as follows, see Figs. 7 and 8. All the pivots 27 of the levers 26 are mounted on a hub 52 which is rotatable on a boss 53 forming the bearing of the shaft 16 in casting 3. Movement of the hub 52 clockwise in Fig. 7 thus moves all the claws 20 towards the centre lines y of the images and simultaneously corrects all the film sections. The hub 52 is rotated from the outside of the case by means of a rod 54 passing through a slot 55, and is locked in position by a knurled head 56 bearing on a plate 57 which covers the slot. Unless the rod 54 is moved back again before the apparatus is used for exposing, the full correction or any will not be obtainable on the resulting film. The rod 54, therefore, is made to engage a catch 58 on one of the doors 7 whenever it is moved from its uppermost position, thus making it impossible to open the doors to insert a film unless the shrinkage correction has been cancelled.

The absence of graininess above referred to and the continuous projection make it possible to re-photograph a projected image without the necessity for synchronising the projector and the taking camera, which may be of the ordinary kind. Hence speed proportioning can give normal slow or accelerated motion as desired from the same original.

Whilst one form of apparatus has been described by way of example, it is to be understood that the invention chiefly lies in the method of taking and projecting films by means of alternate exposures in separate series, irrespective of the apparatus employed.

What I claim as my invention and desire to secure by Letters Patent is:—

1. A cinematographic camera comprising in combination a plurality of lenses arranged in ring formation around a common axis, means for directing their optical axes radially outwards from a view-point direction substantially parallel to said common axis, a continuous circular film track around said lenses, a film claw for each lens, a shutter adapted to close and open each lens in turn, means for continuously oscillating the film claws, and means synchronised with said shutter for bringing each film claw successively into operative engagement with the film whilst the corresponding lens is closed by the shutter.

2. A cinematograph projector comprising in combination a plurality of lenses in ring formation around a common axis, means for directing their optical axes radially outwards from a direction substantially parallel to said common axis, a continuous circular film track around said lenses, a film claw and gate for each lens, means for illuminating the film at each gate, a shutter adapted to close and open each lens in turn, means for continually oscillating the film claws, means for adjusting simultaneously the average position of the strokes of all the film claws, and means synchronised with said shutter for bringing each film claw successively into operative engagement with the film while the corresponding lens is closed by the shutter.

3. A cinematograph projector as claimed in claim 2 in which the film claws are in the form of radially extending arms with means connected intermediate their length to swing them about pivots close to said common axis on a member movable concentric therewith to adjust the positions of the claws circumferentially along the film track.

4. Cinematograph apparatus comprising in combination a plurality of lenses in ring formation around a common axis, a continuous circular film track around the lenses and common axis, means cooperating with the lenses for changing the direction of image bearing light rays by an amount equal to the angle between the common axis and a line perpendicular to the film path, a film gate corresponding to each lens, means for moving a film around said track in succession through said gate one gate at a time, and a shutter synchronized with said film-moving means to close each lens in turn during the interval while the corresponding film part is moved.

BENJAMIN ELLAN LUBOSHEZ.